United States Patent [19]

Bulfer et al.

[11] Patent Number: 5,736,932
[45] Date of Patent: Apr. 7, 1998

[54] SECURITY FOR CONTROLLED ACCESS SYSTEMS

[75] Inventors: Andrew Frederick Bulfer, Mountain Lakes, N.J.; Charles Arthur Witschorik, Naperville, Ill.

[73] Assignee: AT&T Corp, Middletown, N.J.

[21] Appl. No.: 675,029

[22] Filed: Jul. 3, 1996

[51] Int. Cl.$^6$ ............................................. H04Q 1/00
[52] U.S. Cl. ........................ 340/825.34; 340/825.44; 379/211
[58] Field of Search .................. 379/38, 201, 211; 340/825.31, 825.34, 825.44, 825.72

[56] References Cited

U.S. PATENT DOCUMENTS

| | | | |
|---|---|---|---|
| 5,321,242 | 6/1994 | Heath | 340/825.31 |
| 5,347,580 | 9/1994 | Molva | 340/825.31 |
| 5,363,425 | 11/1994 | Mufti et al. | |
| 5,367,572 | 11/1994 | Weiss | 340/825.31 |
| 5,473,689 | 12/1995 | Eberhard | 340/825.31 |
| 5,488,358 | 1/1996 | Hamilton | 340/825.31 |
| 5,528,231 | 6/1996 | Patarin | 340/825.31 |

*Primary Examiner*—Brian Zimmerman
*Attorney, Agent, or Firm*—Alfred G. Steinmetz

[57] ABSTRACT

In order to gain access to a secured system, a user must be able to enter valid user identification information and must also have a remote wireless communication device such as a pager or cellular telephone having a number that is substantially unique to that user. When the user requests access to the secured system, the system places a call to the user's remote wireless communication device and sends that device revalidation information such as a random number generated by the secured system. The user must return the revalidation information to the secured system to gain access. In an alternative embodiment, another person (a user-approver) has the remote wireless communication device and must return the revalidation information to the secured system if the user-approver approves the user's request for access.

24 Claims, 8 Drawing Sheets

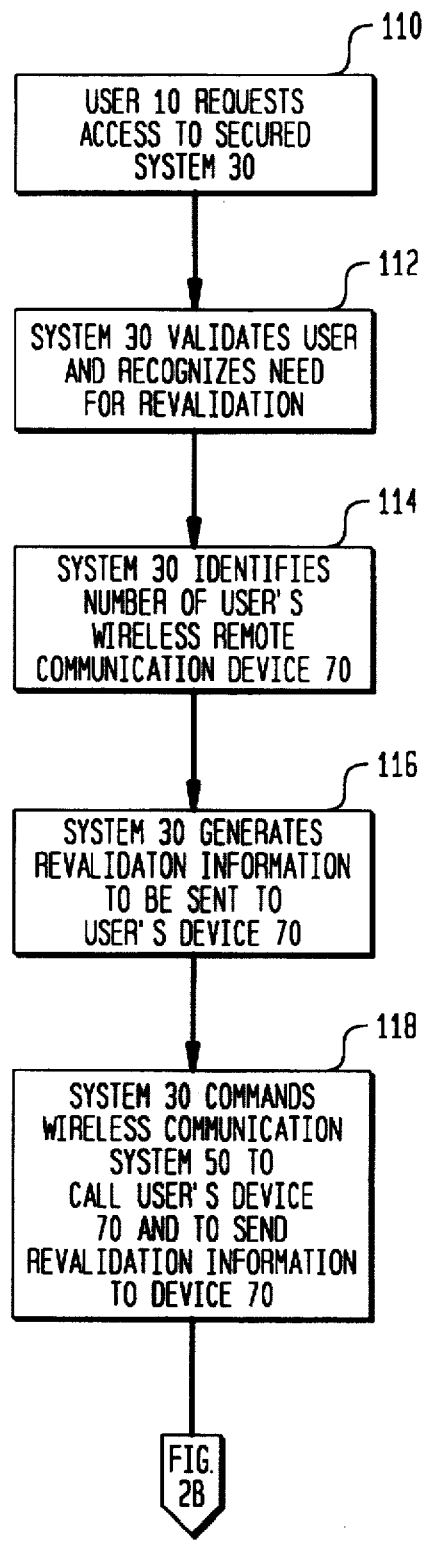

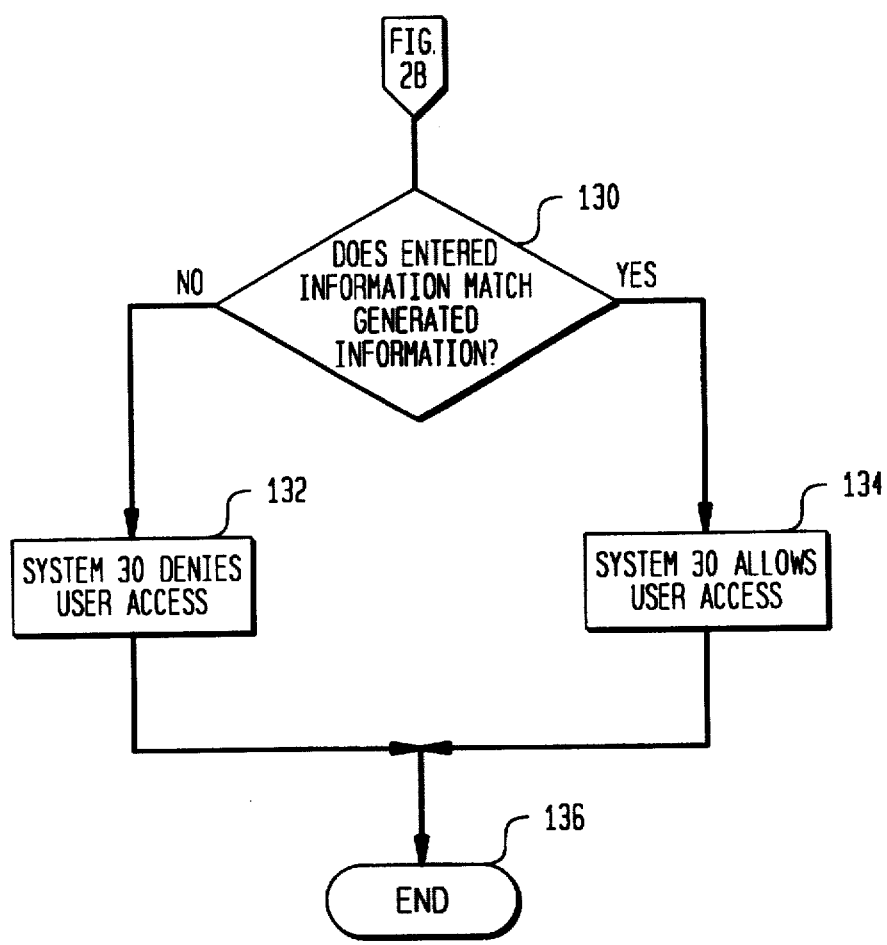

SECURITY FOR CONTROLLED ACCESS SYSTEMS

BACKGROUND OF THE INVENTION

This invention relates to security for controlled access systems (which can, if desired, be systems that are accessible from remote locations). Examples of systems that can make use of this invention are computer systems, transaction processing systems, voice mail and voice response systems, and the like. The security aspect of the invention relates to ensuring that a person who is attempting to gain access to the secured system is authorized to do so.

Many types of controlled access systems are known. Most such systems employ some form of security to reduce the risk of an unauthorized person gaining access to and making use of the system. For example, a system may require someone who is attempting to use the system to first enter some form of user-identification ("user-id"), personal identification number ("pin"), and/or password. Such intangible security information can sometimes be misappropriated, for example, by the misappropriator observing the authorized user's entry of the security information. Other situations may warrant a higher level of security than can be provided by just intangible security information of the type described above. For example, an administrative or super user of a computer system or a voice mail or voice response system may require a higher level of security. Similarly, higher level or administrative access to a secured building, a prison, an airport, a military installation, or other high security location may require a higher level of security.

It is therefore an object of this invention to provide improved security for controlled access systems.

It is a more particular object of this invention to provide security for controlled access systems which requires more than mere possession of intangible information in order for a person to gain access to the system.

SUMMARY OF THE INVENTION

These and other objects of the invention are accomplished in accordance with the principles of the invention by providing security for controlled access systems which requires a person (i.e., a "user") attempting to gain access to the system to have a particular wireless remote communication device such as a pager and to enter into the system information the system requests the user to enter via the wireless remote communication device. For example, the user may establish a modem connection from a personal computer to the secured system. The user may than enter user-identifying information to the secured system via the modem connection. If the secured system recognizes the user-identifying information as valid, the system causes revalidating information to be sent to the user via another separate communication channel. In an especially preferred embodiment the revalidating information is sent to a particular pager which the user must have in order to receive that information. The system then gives the user an opportunity to send the revalidating information back to the system (e.g., via the modem connection). The system allows the user the requested access to the system only if the user is able to send back the revalidating information. If the user has the particular wireless remote communication device required to receive the revalidating information, the user is able to receive and send back that information and thereby gain access to the secured system. If the user does not have the required wireless remote communication device, the user cannot receive and resend the revalidating information, and the user therefore cannot gain access to the secured system.

In another aspect of the invention the wireless remote communication device is intended to be in the possession of a person other than the user. This other person (a "user-approver") receives the revalidating information from the secured system and retransmits that information to the system if the user access request appears to be in order. In this case, to facilitate decision-making by the user-approver, the system may additionally send to the user-approver information about the user (e.g., an identification of the user and information about the location from which the user is attempting to gain access to the system).

Further features of the invention, its nature and various advantages will be more apparent from the accompanying drawings and the following detailed description of the preferred embodiments.

BRIEF DESCRIPTION OF THE DRAWINGS

FIGS. 2a–2c (collectively referred to as FIG. 2) are a flow chart of steps for carrying out an illustrative embodiment of the methods of this invention.

DETAILED DESCRIPTION OF THE PREFERRED EMBODIMENTS

Figure 1:
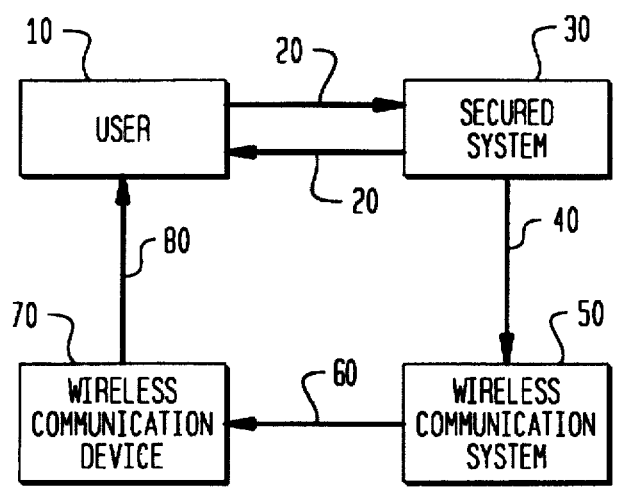
FIG. 1 is a simplified block diagram of illustrative apparatus which can be operated in accordance with this invention.

In the illustrative embodiment shown in FIG. 1 a user 10 requests access to secured system 30 via communication link 20. For example, secured system 30 may be a computer system or network, and the user may have a personal computer (included within box 10) from which the user may wish to access system 30. Communication link 20 may be a modem connection which the user establishes through the commercial telephone network when the user wishes to use system 30. It will be understood that these examples are only illustrative, and that many other types of user equipment 10, secured systems 30, and communication links 20 are possible.

When the user first establishes communication link 20, the user is typically required by system 30 to enter information which identifies the user. For example, the user may be required to enter user id, pin, and/or password information. For convenience herein, all such information is referred to as "user identification information." System 30 checks the validity of the user identification information, and if that information is valid, system 30 continues on as described below with the process of making sure that the user is in fact entitled to access to the system. On the other hand, if system 30 finds that the user identification information supplied by the user is not valid (e.g., it does not correspond to any information in a list of valid user identifications stored in system 30), then system 30 may either terminate connection 20 or prompt the user to try again, and if after a predetermined number of attempts the user is still not able to enter valid user identification information, then system 30 may terminate connection 20.

If system 30 finds that the user identification information entered by user 10 is valid (and assuming that the user and/or type of access requested by the user requires further user validation), system 30 identifies a particular wireless remote communication device 70 that this particular user must have. For example, the user may be required to have a pager with a particular pager number or a cellular telephone with a particular telephone number. For convenience herein, any such wireless remote communication device 70 that user 10 is required to have will be said to have a "wireless remote communication device number" or "activation number" via which device 70 can be substantially uniquely activated. Thus system 30 identifies the wireless remote communication device number of the device 70 that user 10 must have in order to gain access to system 30. Preferably, each user 10 is associated with a device 70 having a unique or substantially unique wireless remote communication device number.

When system 30 has identified the number of the device 70 that user 10 must have, system 30 sends a message (via communication link 40) to the wireless communication system 50 that can communicate with device 70. This message from system 30 instructs system 50 to call device 70 (via wireless communication link 60) and to send it a message that user 10 must send back to system 30 in order to gain access to system 30. For example, system 30 may generate a random or substantially random number (e.g., a substantially random telephone number) for system 50 to send to device 70 via communication link 60. Device 70 may receive this message and display it for user 10 as indicated by link 80. Alternatively, link 80 may be an audio link. When user 10 receives this message, the user sends it back to system 30, for example, via communication link 20. Alternatively, user 10 may send this message back to system 30 in another way (e.g., via elements 70, 60, 50, and 40, if those elements are such as to permit bi-directional communication). When system 30 receives back from user 10 the revalidating message it has sent, system 30 opens system access to the user.

If desired, any or all of communication links 20, 40, and 60 can be protected by conventional security methods such as message encryption or password exchange to ensure that messages are authentic and to lessen the risk of interception by a third party.

Figure 2B:
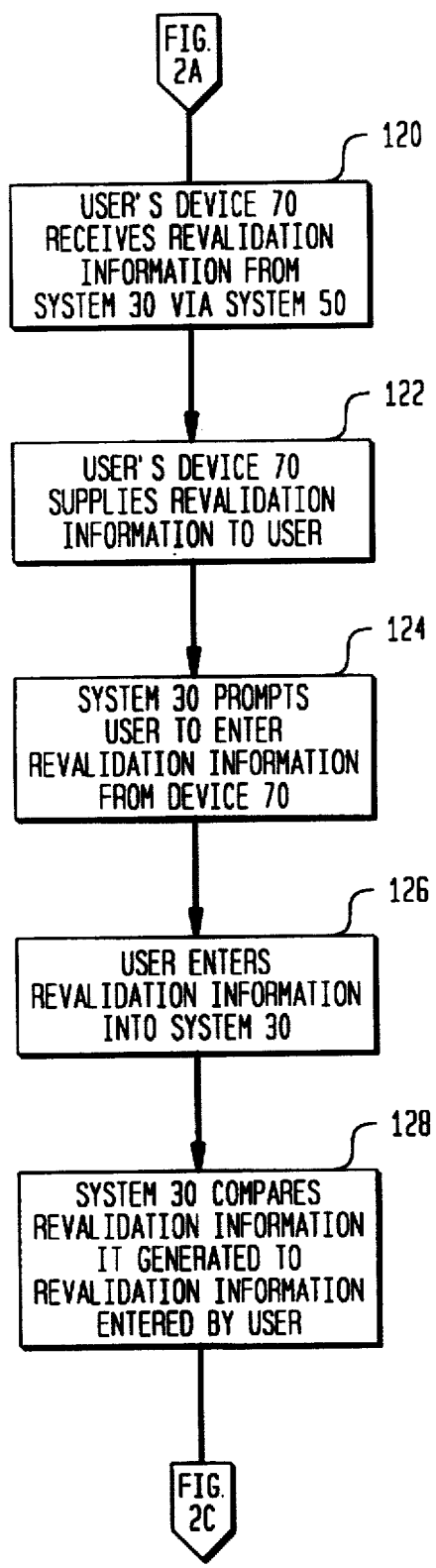

FIG. 2 shows an illustrative sequence of steps in accordance with this invention for operating the apparatus of FIG. 1 as described above. To some extent these steps have already been mentioned, and so the discussion of them here can be somewhat abbreviated.

In step 110 user 10 requests access to secured system 30 via communication link 20. As mentioned above, this generally includes the user supplying some user identification information to system 30.

In step 112 system 30 determines whether the user identification information supplied by user 10 is valid information for an authorized user. To do this, system 30 may compare the user identification information supplied by the user to a list of such information for all authorized users. The steps shown in FIG. 2 assume that the user passes this test, but if not, system 30 may perform additional steps (suggested above) to prompt the user to try again or to disconnect the user (either immediately or after a predetermined number of unsuccessful re-tries by the user).

Also in step 112 (and assuming that the user has supplied valid user identification information), system 30 determines whether this user and/or this user' access request necessitate revalidation. In other words, some users may only be entitled to a relatively low level of access to system 30, which can be granted without further security precautions. Or in some cases a user who might otherwise require more security precautions may request only a low level of access, and so in this case no further security precautions are needed. For the most part, however, the steps shown in FIG. 2 assume that the user and/or the user's access request warrant further security precautions before system 30 grants the requested access. Thus it is assumed that steps 114 et seq. should be performed.

In step 114 system 30 identifies the "activation number" of the wireless remote communication device 70 that user 10 should have in order to gain access to system 30. If device 70 is a pager, this is the number which must be called to reach that pager. If device 70 is a cellular telephone, this is the number of that telephone.

In step 116 system 30 generates revalidation information which is to be sent to user 10 via elements 40, 50, 60, and 70. For example, this revalidation information may be a random or substantially random number (e.g., a random or substantially random telephone number).

In step 118 system 30 commands wireless communication system 50 to call the user's device 70 and to transmit the revalidation information to that device.

In step 120 the user's device 70 receives the revalidation information from system 30 via system 50, and in step 122 device 70 supplies the received revalidation information to the user.

In step 124 system 30 prompts the user to enter the revalidation information received from device 70. Such a prompt may not be necessary in some cases, and so this step can be optional.

In step 126 the user enters into system 30 the revalidation information that the user has received from device 70. Depending on the structure of the overall system, this entry of information by the user may be either via communication link 20 or via a return channel through elements 70, 60, 50, and 40. For example, if device 70 is a pager with no answer-back capabilities, step 126 may be carried out via communication link 20. On the other hand, if device 70 is a pager with answer-back capabilities or a cellular telephone, step 126 may be carried out via elements 70, 60, 50, and 40.

In step 128 system 30 compares the revalidation information it sent out in steps 116 and 118 to the revalidation information returned to it in step 126. If there is a match, then in step 130 control passes to step 134 in which system 30 allows access to the user. On the other hand, if there is no match of the revalidation information, then in step 130 control passes to step 132 where system 30 denies access to the user (e.g., by disconnecting the user after sending the user an appropriate message).

The process ends in step 136.

The order of some of the steps in FIG. 2 is not critical. For example, step 124 (in which system 30 prompts the user to enter the revalidation information) can occur earlier in the process (e.g., between steps 116 and 118). Such earlier occurrence may be desirable to remind the user to be ready to receive the revalidation information via device 70. For example, the user may have to turn on device 70 in order to render it operable, and an early prompt step 124 may be helpful in that regard.

Figure 3:
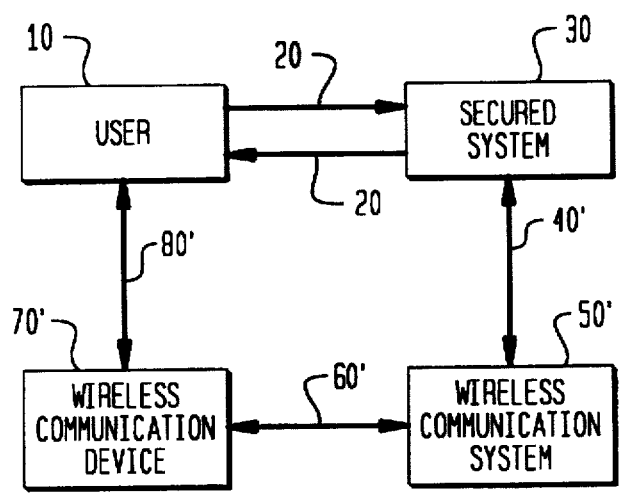
FIG. 3 is a view similar to FIG. 1 showing alternative illustrative apparatus which can be operated in accordance with this invention.

FIG. 3 shows an alternative form of the apparatus shown in FIG. 1. FIG. 3 is similar to FIG. 1 except that FIG. 3 expressly shows that elements 40', 50', 60', 70', and 80' permit two-way communication from system 30 to user 10 and back to system 30. Thus FIG. 3 expressly shows the type of overall system in which the revalidation information sent out by system 30 via elements 40', 50', 60', 70', and 80' can be sent back to system 30 by the user via the reverse path through that same communication channel. The method of FIG. 2 is equally applicable to systems of the type shown in FIGS. 1 and 3.

Figure 4:
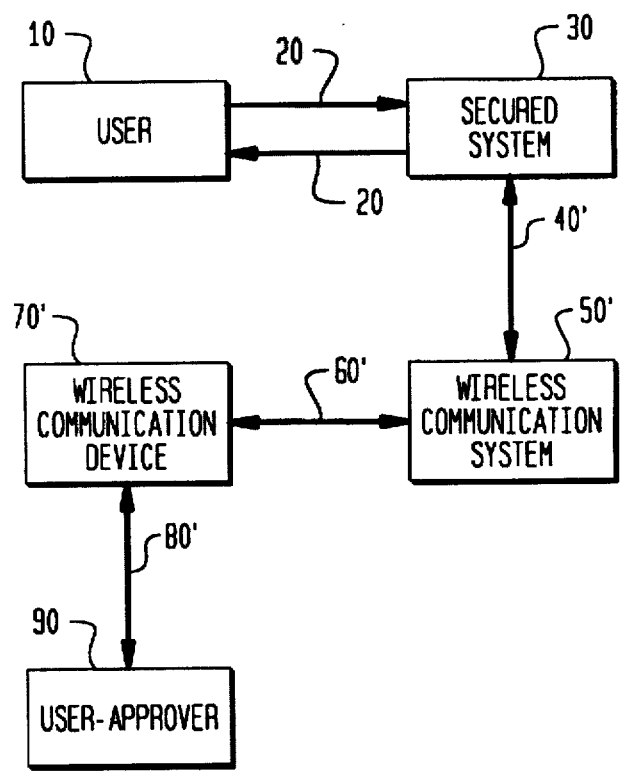
FIG. 4 is another view similar to FIGS. 1 and 3 showing further alternative illustrative apparatus which can be operated in accordance with this invention.

FIG. 4 shows another alternative form of the apparatus shown in FIGS. 1 and 3. In FIG. 4 the wireless communication device 70'associated with user 10 is not in the possession of the user. Instead, another person (user-approver 90) has device 70'. When user 10 requests access to system 30, that system initiates a wireless transmission as before, although in this case the wireless transmission may include information identifying user 10 in addition to some revalidation information. For example, the user identification information may include the telephone number from which user 10 is attempting to access system 30, as well as the user's name or identification number. This user identification information may help user-approver 90 decide whether to approve the user's request for access. If user-approver 90 decides to approve, the user-approver returns the revalidation information to system 30 via the reverse communication channel through elements 70', 60', 50', and 40'. System 30 allows user 10 access when the revalidation information is thus returned to it.

Figure 5A:
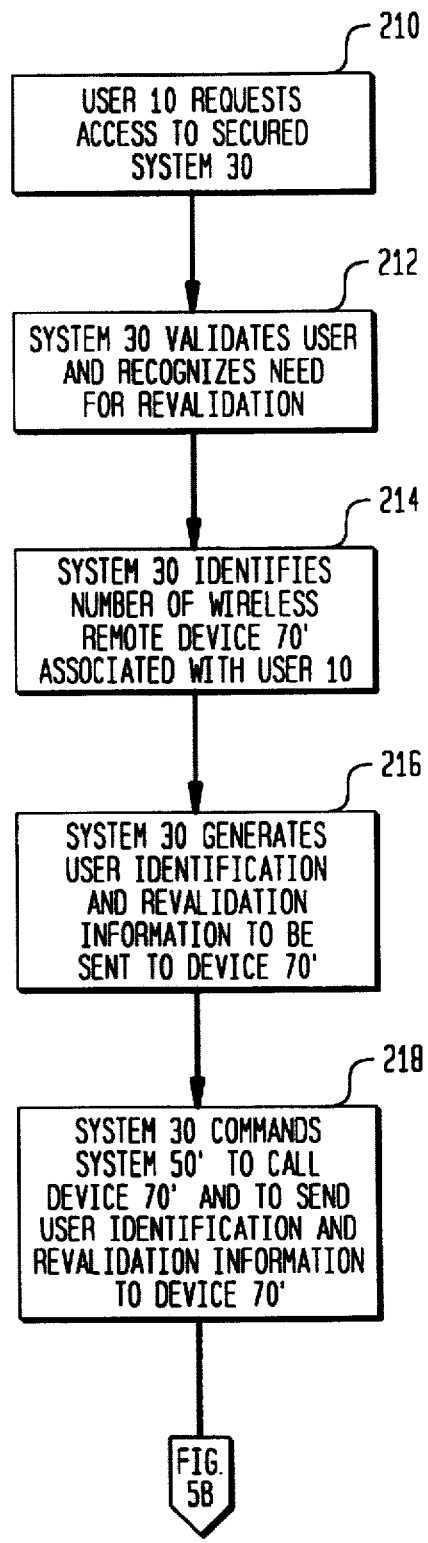
FIGS. 5a–5c (collectively referred to as FIG. 5) are a flow chart of steps for carrying out another illustrative embodiment of the methods of this invention.
Figure 5B:
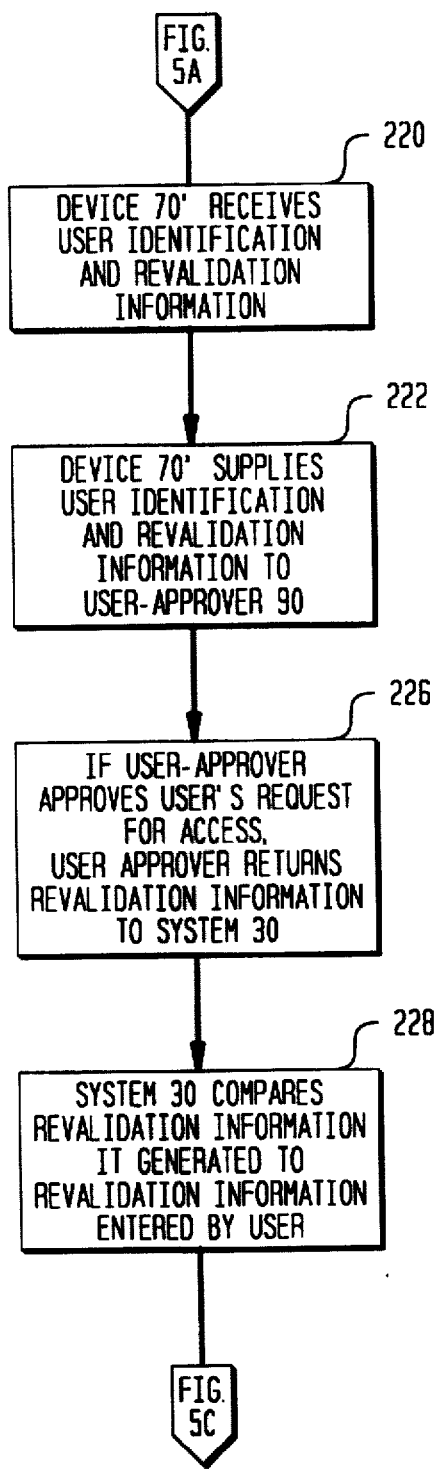
Figure 5C:
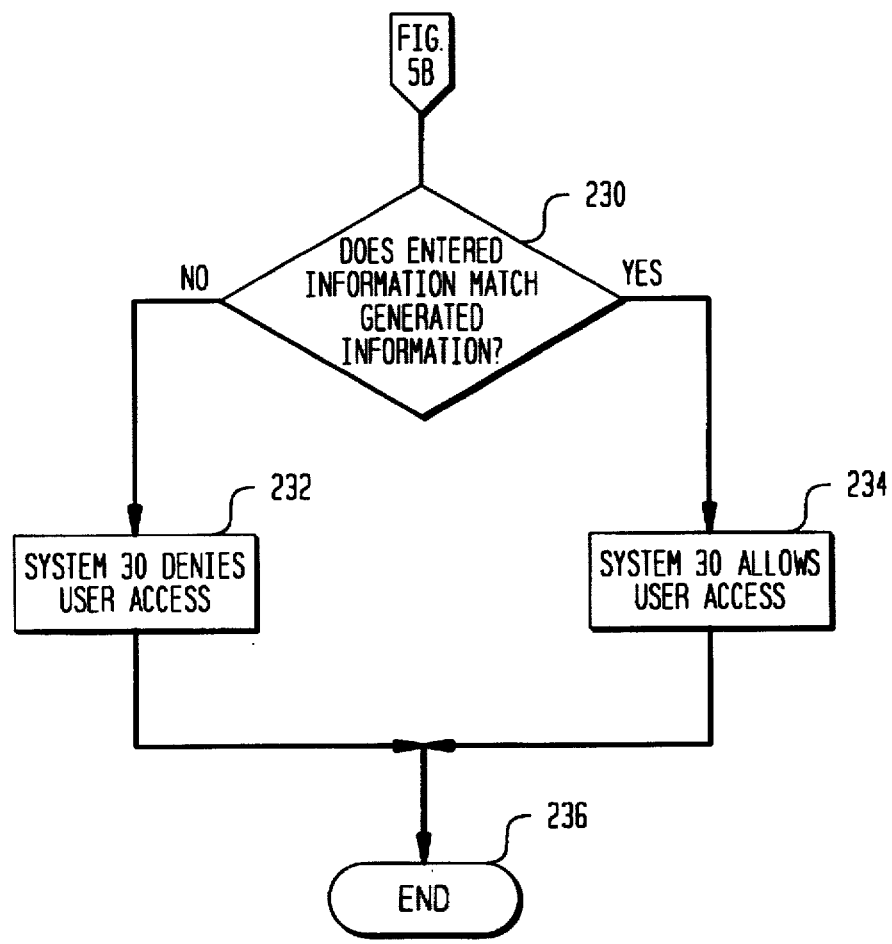

FIG. 5 shows adaptation of the method of FIG. 2 to a system of the type shown in FIG. 4. Many of the steps in FIG. 5 are the same as or similar to steps in FIG. 2, and this correspondence is indicated by use of the same last two reference number digits for the same or similar steps in FIGS. 2 and 5. Thus the discussion of many of the steps in FIG. 5 can be somewhat abbreviated because more extensive discussion has already been provided for corresponding steps in FIG. 2.

In step 210 (similar to step 110 in FIG. 2) user 10 requests access to system 30 via communication channel 20.

In step 212 (similar to step 112 in FIG. 2) system 30 validates user identification information provided by user 10 and recognizes the need for revalidation of this user request for access.

In step 214 (similar to step 114 in FIG. 2) system 30 identifies the activation number of the device 70' associated with the user-approver 90 who must approve the user's request for access.

In step 216 (similar to step 116 in FIG. 2) system 30 generates user identification and revalidation information for transmission to device 70'. As mentioned above, this user identification information may include a name or code number for user 10, the telephone number from which the user is requesting access, etc. The revalidation information may be the same kind of revalidation information that is described above in connection with other embodiments of the invention.

In step 218 (similar to step 118 in FIG. 2) system 30 commands system 50' to call device 70' and to send it the information generated in step 216.

In step 220 (similar to stop 120 in FIG. 2) device 70' receives the above-described information, and in step 222 (similar to step 122) device 70' supplies that information to user-approver 90.

In step 226 (similar to step 126 in FIG. 2) user-approver 90 sends the revalidation information back to system 30 if the user-approver approves the user's request for access.

Remaining steps 228, 230, 232, 234, and 236 are respectively similar to steps 128, 130, 132, 134, and 136 in FIG. 2 and therefore do not need to be described again.

It will be understood that the foregoing is only illustrative of the principles of the invention and that various modifications can be made by those skilled in the art without departing from the scope and spirit of the invention. For example, the invention can be used with many different types of user 10 terminal devices, many different types of secured systems 30, many different types of remote wireless communication devices 70, and consequently many different types of remote wireless communication systems 50. To reiterate, some specific examples of possible uses of the invention include controlling access to computer systems, transaction processing systems, voice mail or voice response systems, and secured facilities such as buildings, prisons, military installations, and other high security locations. The invention may be employed only for certain users such as administrators or other super users.

The invention claimed is:

1. A method for ensuring that a user requesting access to a secured system should be granted such access, said user having substantially unique user identifying information and a wireless communication device with a substantially unique activation number if the user is entitled to access to the secured system, said method comprising the steps of:

entering said user identifying information into said secured system, said entering step being performed by said user;

identifying the activation number of the wireless communication device which the user identified by said user identifying information should have, said identifying step being performed by said secured system;

transmitting revalidation information to the wireless communication device which the user identified by said user identifying information should have, said transmitting step being at least initiated by said secured system;

returning said revalidation information to said secured system, said returning step being performed by said user if said user has the wireless communication device which said user should have; and detecting whether the revalidation information returned in said returning step matches the revalidation information transmitted in said transmitting step, and if so, allowing said user access to said secured system, said detecting step being performed by said secured system.

2. The method defined in claim 1 wherein said wireless communication device is a pager having a pager number as said activation number, and wherein said identifying step comprises the step of:

identifying the pager number of the pager that the user identified by said user identifying information should have.

3. The method defined in claim 2 wherein said transmitting step comprises the steps of:

placing a call to the pager having said pager number; and transmitting said revalidation information to said pager.

4. The method defined in claim 1 wherein said wireless communication device is a cellular telephone having a telephone number as said activation number, and wherein said identifying step comprises the step of:

identifying the telephone number of the cellular telephone that the user identified by said user identifying information should have.

5. The method defined in claim 4 wherein said transmitting step comprises the steps of:

placing a call to the cellular telephone having said telephone number; and transmitting said revalidation information to said cellular telephone.

6. The method defined in claim 1 wherein said transmitting step comprises the step of:

generating substantially different revalidation information substantially each time said transmitting step is performed.

7. The method defined in claim 6 wherein said revalidation information is a substantially random number.

8. The method defined in claim 6 wherein said revalidation information has the general form of a conventional telephone number.

9. The method defined in claim 1 wherein said entering step is performed via a first communication channel between said user and said secured system which is different from a second communication channel used for transmitting said revalidation information to said wireless communication device; and wherein said returning step is performed using one of said first and second communication channels.

10. The method defined in claim 9 wherein said returning step is performed using said first communication channel.

11. The method defined in claim 9 wherein said returning step is performed using said second communication channel.

12. The method defined in claim 1 further comprising the step of:

disconnecting said user from said secured system if said revalidation information returned does not match said revalidation information transmitted.

13. A method for ensuring that a user requesting access to a secured system should be granted such access, said user having substantially unique user identifying information and being associated with a wireless communication device which has a substantially unique activation number if the user is entitled to access to the secured system, said wireless communication device being controlled by a user-approver who must approve said user's request for access to said secured system, said method comprising the steps of:

entering said user identifying information into said secured system, said entering step being performed by said user;

identifying the activation number of the wireless communication device associated with the user identified by said user identifying information, said identifying step being performed by said secured system;

transmitting revalidation information to the wireless communication device associated with the user identified by said user identifying information, said transmitting step being at least initiated by said secured system;

returning said revalidation information to said secured system, said returning step being performed by said user-approver if said user-approver approves said user's request for access to said secured system; and detecting whether the revalidation information returned in said returning step matches the revalidation information transmitted in said transmitting step, and if so, allowing said user access to said secured system, said detecting step being performed by said secured system.

14. The method defined in claim 13 wherein said wireless communication device is a pager having a pager number as said activation number, and wherein said identifying step comprises the step of:

identifying the pager number of the pager associated with the user identified by said user identifying information.

15. The method defined in claim 14 wherein said transmitting step comprises the steps of:

placing a call to the pager having said pager number; and transmitting said revalidation information to said pager.

16. The method defined in claim 13 wherein said wireless communication device is a cellular telephone having a telephone number as said activation number, and wherein said identifying step comprises the step of:

identifying the telephone number of the cellular telephone associated with the user identified by said user identifying information.

17. The method defined in claim 16 wherein said transmitting step comprises the steps of:

placing a call to the cellular telephone having said telephone number; and transmitting said revalidation information to said cellular telephone.

18. The method defined in claim 13 wherein said transmitting step comprises the step of:

generating substantially different revalidation information substantially each time said transmitting step is performed.

19. The method defined in claim 18 wherein said revalidation information is a substantially random number.

20. The method defined in claim 18 wherein said revalidation information has the general form of a conventional telephone number.

21. The method defined in claim 13 wherein said entering step is performed via a first communication channel between said user and said secured system, and wherein said transmitting and returning steps are performed via a second communication channel between said secured system and said user-approver.

22. The method defined in claim 13 further comprising the step of:

disconnecting said user from said secured system if said revalidation information returned does not match said revalidation information transmitted.

23. The method defined in claim 13 wherein said transmitting step includes the step of:

transmitting to the wireless communication device associated with the user identified by said user identifying information additional information descriptive of the user's request for access to the secured system.

24. The method defined in claim 23 wherein said entering step is performed via the commercial telephone network by the user calling said secured system from a calling telephone number, and wherein said additional information includes said calling telephone number.

* * * * *